(12) United States Patent
Pusch

(10) Patent No.: US 8,400,286 B2
(45) Date of Patent: Mar. 19, 2013

(54) SPACER LAMP IN PASSENGER AND/OR GOODS TRAFFIC

(75) Inventor: Gereon Johannes Pusch, Graz (AT)

(73) Assignee: MAGNA STEYR Fahrzeugtechnik AG & Co. KG, Graz (AT)

( * ) Notice: Subject to any disclaimer, the term of this patent is extended or adjusted under 35 U.S.C. 154(b) by 336 days.

(21) Appl. No.: 12/679,062

(22) PCT Filed: Sep. 12, 2008

(86) PCT No.: PCT/EP2008/062202
§ 371 (c)(1),
(2), (4) Date: Aug. 24, 2010

(87) PCT Pub. No.: WO2009/040263
PCT Pub. Date: Apr. 2, 2009

(65) Prior Publication Data
US 2010/0308985 A1 Dec. 9, 2010

(30) Foreign Application Priority Data

Sep. 20, 2007 (DE) .......................... 10 2007 045 107

(51) Int. Cl.
*B60Q 1/00* (2006.01)
*B60Q 1/50* (2006.01)
*B60Q 1/44* (2006.01)
*B60Q 3/04* (2006.01)
*G06F 1/16* (2006.01)
*F21V 29/00* (2006.01)
*F21V 21/00* (2006.01)

(52) U.S. Cl. ........ 340/435; 340/436; 340/467; 340/479; 701/301; 362/543; 362/544; 362/545

(58) Field of Classification Search .................. None
See application file for complete search history.

(56) References Cited

U.S. PATENT DOCUMENTS

| | | | |
|---|---|---|---|
| 3,192,437 A | 6/1965 | Meyer | |
| 3,617,038 A * | 11/1971 | Schmidt et al. | 432/58 |
| 3,868,629 A | 2/1975 | Caine | |
| 3,949,362 A * | 4/1976 | Doyle et al. | 340/435 |
| 4,641,136 A * | 2/1987 | Kowalczyk | 340/904 |
| 6,240,346 B1 | 5/2001 | Pignato | |
| 6,411,204 B1 | 6/2002 | Bloomfield et al. | |
| 7,057,501 B1 * | 6/2006 | Davis | 340/435 |
| 7,242,287 B1 * | 7/2007 | Giovinazzo | 340/479 |
| 2002/0130770 A1 * | 9/2002 | Keyworth et al. | 340/436 |
| 2007/0168129 A1 | 7/2007 | Thorne | |
| 2010/0308985 A1 * | 12/2010 | Pusch | 340/435 |

FOREIGN PATENT DOCUMENTS

| | | |
|---|---|---|
| DE | 19952408 | 5/2001 |
| DE | 102005032921 | 2/2007 |
| GB | 2291244 | 1/1996 |
| WO | 0018594 | 4/2000 |

* cited by examiner

*Primary Examiner* — George Bugg
*Assistant Examiner* — Renee Dorsey
(74) *Attorney, Agent, or Firm* — Bachman & LaPointe, P.C.

(57) ABSTRACT

A spacer lamp in passenger and/or goods traffic, with a light field which dispenses light according to an illuminating configuration, wherein the light field 6 has a first and a second light source, and a control unit is provided for controlling the illumination configuration of the light field, wherein the light field 6 has a first illuminating characteristic for the eye of an average adult as he approaches the light field until a predefined spacing depending on a configuration parameter is reached, and has a second illuminating characteristic different from the first one if the spacing falls short of the predefined spacing.

22 Claims, 5 Drawing Sheets

SPACER LAMP IN PASSENGER AND/OR GOODS TRAFFIC

BACKGROUND OF THE INVENTION

The invention relates to a distance lamp in passenger and/or goods traffic, for example as a distance warning lamp or safety lamp, comprising a light field, which emits light in accordance with a luminous configuration, wherein the light field has a first and a second light source and provision is made of a control unit for controlling the luminous configuration of the light field, and the first and the second light sources can be driven by the control unit and, by means of a control logic, the first and the second light sources can be respectively assigned a temporally variable profile of the light intensity thereof.

The prior art discloses various technical solutions in respect of this.

Thus, by way of example, DE 199 52 408 C2 discloses providing a system for advance warning or advance information for other road users. In that case it is provided that a vehicle in a hazardous situation, for example during/after an emergency stop, automatically warns any following traffic by the triggering of corresponding optical signals.

DE 10 2005 032 921 A1 discloses constituting a light field of a vehicle lighting device by means of a plurality of light sources and thereby generating different luminous configurations of a light field which are luminous in a constant fashion.

U.S. Pat. No. 6,411,204 discloses embodying a collision warning device as a light field that is driven in a suitable manner.

It is an object of the present invention to improve the prior art further and, in particular, to develop a suitable means for maintaining a defined distance from an object, in particular for maintaining a safety distance between two vehicles travelling one behind the other.

SUMMARY OF THE INVENTION

According to the invention, this object is achieved by means of a device comprising a distance lamp in passenger and/or goods traffic comprising a light field, which emits light in accordance with a luminous configuration, wherein the light field has a first and a second light source and provision is made of a control unit for controlling the luminous configuration of the light field, and the first and the second light sources can be driven by the control unit and, by means of a control logic, the first and the second light sources can be respectively assigned a temporally variable profile of the light intensity thereof, wherein the light intensities of the first and of the second light sources can be increased and decreased diametrically oppositely in each case at a predetermined time interval, and the luminous configuration of the light field can be set with the aid of the control unit by control of the first and of the second light sources in a manner dependent on a first configuration parameter in such a way that the light field has, for the eye of an average adult upon approaching the light field until reaching a predefined distance—dependent on the first configuration parameter—from the light field, a first luminous characteristic, which is characterized by a substantially constant light intensity, and, for the eye of an average adult, when the predefined distance from the light field is undershot, in accordance with a second luminous characteristic, the first light source can be distinguished at least partly from the second light source and the alternately increasing and decreasing light intensity of the light sources of the light field is consciously perceptible, wherein the predefined distance is at least 0.5 meter from the light field.

According to one particular embodiment of the invention, the first and the second light sources can be driven by the control unit and, by means of a control logic, the first and the second light sources can be respectively assigned a temporally variable profile of the light intensity thereof, wherein the light intensities of the first and of the second light sources can be increased and decreased diametrically oppositely in each case at a predetermined time interval, and the luminous configuration of the light field can be set with the aid of the control unit by control of the first and of the second light sources in a manner dependent on a first configuration parameter in such a way that the light field has, for the eye of an average adult upon approaching the light field until reaching a predefined distance—dependent on the first configuration parameter—from the light field, a first luminous characteristic, which is characterized by a substantially constant light intensity, and, for the eye of an average adult, when the predefined distance from the light field is undershot, in accordance with a second luminous characteristic, the first light source can be distinguished at least partly from the second light source and the alternately increasing and decreasing light intensity of the light sources of the light field is consciously perceptible, wherein the predefined distance is at least 0.5 meter from the light field.

According to one particular embodiment, the predefined distance is at least 1 meter, preferably at least 2 meters, particularly preferably at least 5 to 10 meters, from the light field.

According to one particular embodiment of the invention, the eye of an average adult serves as a reference for the characterization of the luminous characteristic of the light field.

According to one particular embodiment of the invention, a signal of a switch (OFF/ON) or a constant predefined value is used, by way of example, as first configuration parameter.

According to one particular embodiment of the invention, a substantially constant light intensity is characterized by a—when averaged over the light field and viewed over a period of at least 1 s and also viewed by the eye of an average adult—maximum fluctuation range of the light intensity of the light field of ±25%.

According to one particular embodiment of the invention, the control unit has a frequency unit, by means of which it is possible to change the light intensity of the first and of the second light sources with a frequency in a range of between 0.1 Hz and 75 Hz, preferably between 0.1 Hz and 50 Hz, particularly preferably between 0.5 Hz and 10 Hz, for example between 1 Hz and 5 Hz.

According to one particular embodiment of the invention, the first and/or second light source of the light field are/is formed at least in part by a number of light emitting diodes and/or a display.

According to one particular embodiment, the distance lamp is formed by a plurality of light fields, of which for example one or a plurality of the light fields has/have a constant light intensity.

According to one particular embodiment of the invention, the distance lamp is embodied as part of exterior lighting of a vehicle, for example as a rear light at the rear of the vehicle.

According to other possible embodiments, the distance lamp is provided as stationary lighting, for example in road traffic or in a factory building when delivering goods to an assembly line.

According to a further preferred embodiment, the distance lamp is suitable for identifying escape routes or for attachment to luminous advertising devices.

According to one particular embodiment of the invention, a speed of a vehicle is provided as first configuration parameter.

According to one particular embodiment of the invention, a predetermined limit speed of the vehicle is provided as an activation threshold and the light field has a substantially constant light intensity below the limit speed.

According to one particular embodiment of the invention, provision is made of an activation unit for activating and/or deactivating the constant light intensity of the light field, and the activation unit has a hysteresis loop. In this case, according to one particular embodiment of the invention, the deactivation threshold can be set below the activation threshold, for example relative to the speed of a vehicle. It is thereby possible to prevent continuous activation and deactivation in the limit range.

According to one particular embodiment of the invention, provision is made of a first sensor connected to the control unit and the light field and serving for determining the first configuration parameter.

According to one particular embodiment of the invention, provision is made of a second sensor for determining a second configuration parameter, wherein a roadway constitution and/or a vehicle constitution and/or a time of day and/or a location determining signal and/or an ambient brightness can be mapped by means of the second configuration parameter. According to one particular embodiment of the invention, the sensor for determining the second configuration parameter is connected to the control unit in such a way that the luminous configuration of the light field can be changed in a manner dependent on the second configuration parameter.

According to one particular embodiment of the invention, the light field having the first and the second light sources and, if appropriate, additional light sources has a number of activatable light sources and, by means of the control logic by means of a selected activation of light sources from the number of activatable light sources or by means of a local adjustment of individual active light sources, the distance between the active light sources in the light field can be set in a manner dependent on the first configuration parameter.

According to one particular embodiment, the distance between the first and the second light sources can be adjusted, for example by means of a corresponding actuator.

The invention is furthermore characterized by a method for controlling a distance lamp in passenger and/or goods traffic comprising a light field, which emits light in accordance with a luminous configuration, wherein the light field has at least a first light source and a second light source and provision is made of a control unit having a control logic for controlling the luminous configuration of the light field, and the first and the second light sources are driven by the control unit and the first and the second light sources are respectively assigned a temporally variable profile of the light intensity thereof, wherein the light intensities of the first and of the second light sources can be increased and decreased diametrically oppositely in each case at a predetermined time interval, and the luminous configuration of the light field is set with the aid of the control unit by control of the first and of the second light sources in a manner dependent on a first configuration parameter in such a way that the light field has, for the eye of an average adult upon approaching the light field until reaching a predefined distance—dependent on the first configuration parameter—from the light field, a first luminous characteristic, which is characterized by a substantially constant light intensity, and, for the eye of an average adult, when the predefined distance from the light field is undershot, in accordance with a second luminous characteristic, the first light source can be distinguished at least partly from the second light source and the alternately increasing and decreasing light intensity of the light sources of the light field is consciously perceptible, wherein the predefined distance is at least 0.5 meter from the light field.

According to one particular embodiment of the method according to the invention, the first and the second light sources are driven by the control unit and the first and the second light sources are respectively assigned a temporally variable profile of the light intensity thereof, wherein the light intensities of the first and of the second light sources can be increased and decreased diametrically oppositely in each case at a predetermined time interval, and the luminous configuration of the light field is set with the aid of the control unit by control of the first and of the second light sources in a manner dependent on a first configuration parameter in such a way that the light field has, for the eye of an average adult upon approaching the light field until reaching a predefined distance—dependent on the first configuration parameter—from the light field, a first luminous characteristic, which is characterized by a substantially constant light intensity, and, for the eye of an average adult, when the predefined distance from the light field is undershot, in accordance with a second luminous characteristic, the first light source can be distinguished at least partly from the second light source and the alternately increasing and decreasing light intensity of the light sources of the light field is consciously perceptible, wherein the predefined distance is at least 0.5 meter from the light field.

According to one particular embodiment of the method according to the invention, the control unit has a frequency unit, by means of which it is possible to change the light intensity of the first and of the second light sources with a frequency in a range of between 0.1 Hz and 75 Hz, preferably between 0.1 Hz and 50 Hz, particularly preferably between 0.5 Hz and 10 Hz.

According to one particular embodiment of the method according to the invention, the distance lamp is used as part of exterior lighting of a vehicle, for example as a rear light at the rear of the vehicle.

According to one particular embodiment of the method according to the invention, the speed of the vehicle is recorded as first configuration parameter.

According to one particular embodiment of the method according to the invention, the recorded speed of the vehicle is compared with a limit speed, and, in the case where a speed recorded by the sensor is below the limit speed, a substantially constant light intensity is allocated to the light field, if appropriate by means of the interposition of a hysteresis loop.

According to one particular embodiment of the method according to the invention, provision is made of a first sensor connected to the control unit and the light field and serving for determining the first configuration parameter.

According to one particular embodiment of the method according to the invention, provision is made of a second sensor for determining a further parameter, wherein the further parameter maps a roadway constitution and/or a vehicle constitution and/or a time of day and/or a location determining signal and/or an ambient brightness, and the control unit changes the luminous configuration of the light field in a manner dependent on the further parameter.

According to one particular embodiment of the method according to the invention, the light field having the first and the second light sources and, if appropriate, additional light sources has a number of activatable light sources and, by means of the control logic by means of a selected activation of light sources from the number of activatable light sources or by means of a local adjustment of individual active light sources, the distance between the active light sources in the light field is altered in a manner dependent on the first configuration parameter.

According to one particular embodiment of the invention, the luminous configuration of the light field can be altered by means of the control unit by control of the first and of the second light sources in a manner dependent on the configuration parameter in such a way that the light field has, for an average adult when approaching the light field until reaching a predefined distance—dependent on the respective configuration parameter—from the light field, a first luminous characteristic, which is characterized by a light intensity that is substantially constant when averaged over the light field, with a maximum fluctuation range of ±20%, preferably with a maximum fluctuation range of ±10%, and the light field has, for an average adult upon approaching the light field and when the predefined distance from the light field is undershot by more than 25%, preferably by more than 30%, a second luminous characteristic, which is different from the first and is characterized by a, when averaged over the light field, with a minimum fluctuation range of ±50%, preferably with a minimum fluctuation range of ±70%, of the light intensity.

According to one particular embodiment of the invention, the specified values of the light intensity relate to the amplitudes of the luminous intensities of the light sources.

According to one particular embodiment of the invention, the first and/or the second light source is/are formed by a number of light emitting diodes or a display.

According to one particular embodiment of the invention, the first and the second light sources are arranged at a distance from one another and can in each case be driven separately by the control unit, and the control unit has a control logic, by means of which the first and the second light sources are respectively assigned a temporally variable profile of the light intensity and by means of which the light intensity of the first and of the second light sources can be increased and decreased diametrically oppositely in each case at a predetermined time interval, such that when the predefined distance from the light field is undershot by more than 25%, preferably by more than 50%, for the average adult, the alternately increasing and decreasing light intensity of the light sources of the light field is consciously perceptible.

According to one particular embodiment of the invention, an optical delimiting element that is substantially opaque to light is arranged between the first and the second light sources. In this case, according to one embodiment, substantially opaque is understood by definition to mean an optical transmission rate of max. 10%.

According to one particular embodiment of the invention, the distance between the first and the second light sources can be set by means of a suitable actuating device in a manner dependent on the configuration parameter.

According to one particular embodiment of the invention, a third light source is provided. According to one particular embodiment, the third light source can be driven separately from the first and the second light sources and is arranged at a first distance from the first light source and at a second distance from the second light source, wherein the first distance is greater in magnitude than the second distance, and the second and/or third light source can be driven in a manner dependent on the configuration parameter in such a way that, until the predefined distance dependent on the configuration parameter is reached, the second and/or third light source is consciously perceptible to the average adult in a manner not delimited optically from the first light source, and, when the predefined safety distance is undershot by more than 25%, in particular when the predefined safety distance is undershot by more than 50%, the second and/or third light source is consciously perceptible in a manner delimited optically from the first light source.

According to one particular embodiment of the invention, a speed of a vehicle is provided as configuration parameter. According to one particular embodiment of the invention, the sensor is designed for recording said speed.

According to one particular embodiment of the invention, the lighting device is embodied as part of the exterior lighting of the vehicle, for example as a rear light at the rear of the vehicle.

According to one particular embodiment of the invention, a storage unit connected to the control unit is provided, in which are stored, with respect to different speeds of the vehicle, in each case the associated predefined control values for the control of the light configuration of the light field by the control unit.

According to one particular embodiment of the invention, a limit speed of the vehicle is provided as an activation threshold, wherein an approximately constant light intensity of the luminous field, in particular in accordance with the characteristic of the light intensity of the static tail lamps that are customary in the prior art, is established below the limit speed.

According to one particular embodiment of the invention, provision is made of a second sensor for determining a second parameter, wherein a roadway constitution and/or a vehicle constitution and/or a time of day and/or a location determining signal and/or the ambient brightness can be mapped by means of the further parameter, and the sensor for determining the second parameter is connected to the control unit in such a way that the luminous configuration of the light field can be changed in a manner dependent on the further parameter.

According to one particular embodiment of the invention, in this case the control unit records the configuration parameter by means of the sensor and the control unit adapts the luminous configuration of the light field by control of the first and of the second light sources in a manner dependent on the configuration parameter in such a way that an average adult perceives, upon approaching the light field until reaching a predefined distance, dependent on the configuration parameter, a first luminous characteristic, which is substantially characterized by a light intensity that is substantially constant when averaged over the light field, with a maximum fluctuation range of ±20%, preferably with a maximum fluctuation range of ±10%, and the average adult consciously perceives, upon approaching the light field and when the predefined distance—dependent on the configuration parameter—from the light field is undershot by more than 25%, preferably by more than 30%, a second luminous characteristic, which is different from the first and is characterized by a, when averaged over the light field, with a minimum fluctuation range of ±50% of the light intensity, preferably with a minimum fluctuation range of ±70% of the light intensity.

According to one particular embodiment of the invention, the first and the second light sources are arranged at a distance from one another. According to one particular embodiment, the light sources are in each case driven separately by the control unit and the first and the second light sources are respectively assigned a temporally variable profile of the light intensity, wherein the control unit, by means of a control logic, increases and decreases the light intensity of the first and of the second light sources diametrically oppositely in each case at a predetermined time interval, such that when the predefined distance from the light field is undershot by more than 25%, preferably by more than 50%, for the average adult, the alternately increasing and decreasing light intensity of the light sources of the light field is consciously perceptible.

According to one particular embodiment of the invention, the distance between the first and the second light sources is set in a manner dependent on the configuration parameter of the vehicle.

According to one particular embodiment of the invention, a third light source is provided, which is controlled separately from the first and the second light sources and is arranged at a first distance from the first light source and at a second distance from the second light source, wherein the first distance is greater in magnitude than the second distance, and the second and/or third light source is driven in a manner dependent on the configuration parameter of the vehicle in such a way that, until the predefined distance, dependent on the configuration parameter, is reached, the second and/or third light source is consciously perceived by the average adult in a manner not delimited optically from the first light source, and, when the predefined distance is undershot by more than 25%, the third light source is consciously perceived in a manner delimited optically from the first light source.

According to one particular embodiment of the invention, the lighting device is embodied as part of the exterior lighting of a vehicle, for example as a rear light at the rear of the vehicle. According to one particular embodiment of the invention, the speed of the vehicle is recorded as the configuration parameter by means of the sensor.

According to one particular embodiment of the invention, the vehicle speed recorded by means of the sensor is compared with a limit speed, and, in the case where a speed recorded by the sensor is below the limit speed, a substantially constant illumination of the luminous field, in accordance with the customary static tail lamps, is set.

According to one particular embodiment of the invention, a storage unit connected to the control unit is provided, in which is stored, with respect to different speeds of the vehicle, in each case the associated predefined safety distance or braking distance and the control unit reads out the associated safety distance from the control unit in a manner dependent on the speed recorded by means of the sensor.

According to one particular embodiment of the invention, provision is made of a second sensor for determining a further parameter, wherein the further parameter maps a roadway constitution and/or a vehicle constitution and/or a time of day and/or a location determining signal and/or an ambient brightness, wherein the control unit changes the luminous configuration of the light field in a manner dependent on the further parameter.

According to one particular embodiment of the invention, the structural embodiment should be configured with the aid of light emitting diodes and prisms, for example by means of a suitable number and density of the arrangement of LEDs and/or the configuration of the prisms used, in such a way that the resolving power of the average human eye is used to maintain an appropriate distance from the person in front. By virtue of the fact that the human eye, upon approaching too close to the vehicle travelling ahead, perceives the flickering or flashing of a rear light of the vehicle travelling ahead, it is expected that the driver of the vehicle behind will subconsciously automatically distance himself/herself again from the vehicle travelling in front. Tailgating at relatively high speeds can be avoided, by way of example, as a result of this measure. Below a certain speed, the function is intended to be deactivated in order not to contribute unnecessarily to sensory overload in road traffic. With appropriately good resolution of the rear light, it is conceivable to assign different luminous characteristics, for example different flashing frequencies, to different speeds and to call them up as necessary depending on the speed of the vehicle.

According to various particular embodiments of the invention, in order to generate the optical stimulus, the light intensity of the light source is varied with a predetermined frequency. According to one particular embodiment, frequencies of below 50 Hz, preferably of between 0.1 Hz and 50 Hz, particularly preferably of between 0.5 Hz and 10 Hz, for example a frequency of 2 Hz, have proved to be particularly suitable in this case.

According to one particular embodiment of the present invention, therefore, influencing is effected by conspicuous flashing of the light field, this flashing attracting the attention of the following road user, in particular briefly, in order to motivate or instruct road users, if appropriate subconsciously, to maintain the safety distance.

According to a further possible embodiment of the invention, the distance between the light sources, for example LEDs used as light sources, is increased.

BRIEF DESCRIPTION OF THE DRAWINGS

The invention is elucidated schematically and by way of example—non-restrictively—below on the basis of a number of exemplary embodiments. In the figures.

DETAILED DESCRIPTION

Figure 1:
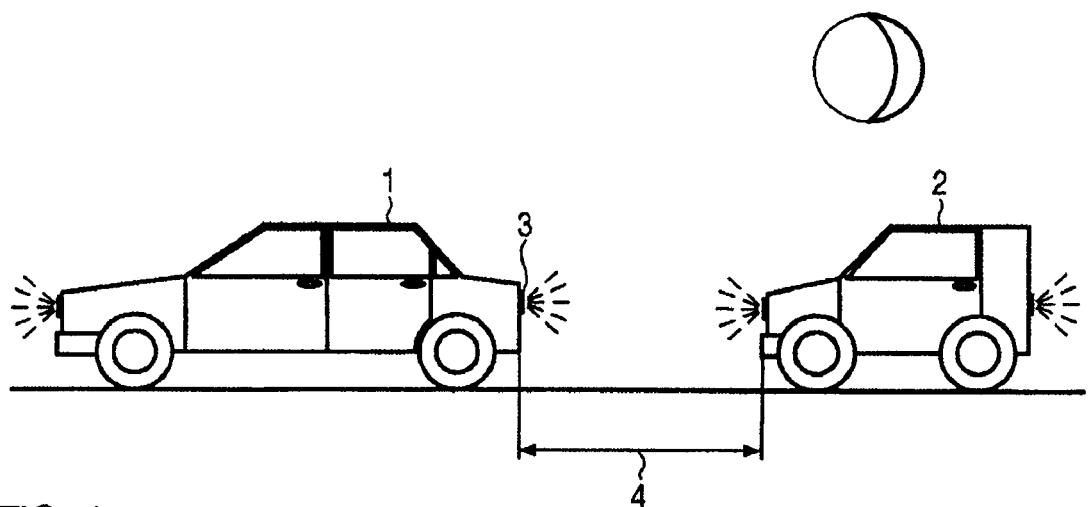
FIG. 1 shows a possible embodiment of the subject matter of the invention in a first schematic illustration

FIG. 1 schematically illustrates a first vehicle 1 and a second vehicle 2. Particularly during journeys at night, drivers tend to orient themselves by the rear lights 3 of vehicles travelling ahead. A necessary safety distance 4, which might prevent a collision in the event of the vehicle in front performing an unexpected braking maneuver, is often undershot. In order to be able better to ensure that said safety distance is maintained or in order better to indicate to the driver of a following vehicle the fact that the necessary safety distance is undershot, in accordance with one embodiment of the present invention, provision is made for changing the luminous characteristic of the rear light 3, for example by continually switching the latter off and on or by continually changing the light intensity, in such a way that an optical flashing of the rear light or some other type of optical "agitation" in the rear light or the light field of the rear light can be observed by the driver of the following driver when a predefined safety distance 4 is undershot. According to one particular embodiment of the invention, in this case, by way of example, the frequency of the flashing of the rear light is set in a manner dependent on the speed of the first vehicle 1, that is to say that, by way of example, the frequency is correspondingly increased or decreased when there is a change in speed. The desired flashing of the rear light 3 can be effected for example in an extremely simple manner by means of the light source, for example LEDs used, being continually switched off and on. According to another embodiment, the light sources are not switched off and on, rather the light intensity is merely dimmed back and forth by means of a suitable control at predetermined time intervals.

For changing the light intensity of the rear light 3, a frequency is chosen at which the driver of the following vehicle 2, when maintaining the necessary safety distance 4, no longer perceives the continual change in the light intensity of the individual light sources of the rear light 3 on account of the limited resolving power of the human eye. In this case, the light sources are coordinated in such a way that, with increasing distance from the light field, the two light sources can no longer be resolved as separate light sources by the average human eye. A corresponding adaptation of the temporal profiles of the light intensities intensifies or gives the impression of a single light source having a substantially constant light intensity. It is only when the necessary safety distance 4 is undershot that the driver of the following vehicle notices the change in the light intensity of the individual light sources of the rear light 3 and accordingly becomes attentive. Consequently, the following driver experiences a plurality of different luminous characteristics, in particular at least two, depending on the distance from the light field in the case of a single luminous configuration of the light field.

According to one possible embodiment, the change in the light intensity of the rear light 3, for example as flickering of the rear light, can in this case be set in such a way that, when the necessary safety distance is undershot, the average adult finds the characteristic of this signal to be unpleasant and therefore reduces the speed of his/her vehicle and establishes, if appropriate re-establishes, the necessary safety distance.

According to another embodiment of the subject matter of the invention, the human eye can be assisted by means of suitable optical sensors which are arranged on the vehicle and which identify a change in the characteristic of the luminous fields of the vehicle travelling ahead and indicate it to the driver in a suitable manner.

Figure 2A:
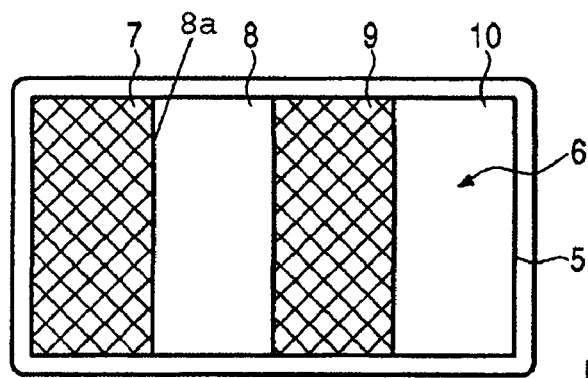
FIG. 2 shows a possible embodiment of the subject matter of the invention in a second schematic illustration

A further possibility for attracting the attention of the following driver is illustrated in FIG. 2. Here the rear light 5 illustrated has a light field 6 composed of a plurality of light sources 7, 8, 9, 10, which, according to one preferred embodiment, are separated from one another by delimiting elements 8a that are substantially opaque to light (only a single delimiting element is referenced in FIG. 2a for the sake of clarity).

As illustrated in FIG. 2(a), at very low speeds, for example in a locality, the luminous configuration of the light field 6 is set in such a way that two light sources 7 and 9 of the rear light 5 emit light. These two light sources are perceived by a driver of a following vehicle as separate light sources only when a safety distance X is undershot.

Figure 2B:
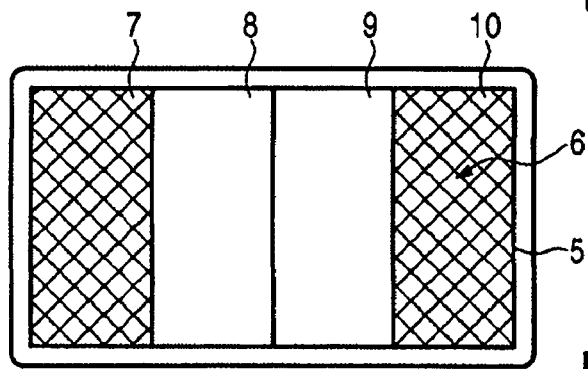

At a higher speed, as illustrated in FIG. 2(b), the light sources 7 and 10 are activated, which, beyond and up to a predefined safety distance Y, are perceived by the following driver as a single light source, on account of the limited resolving power of the human eye, but, as the necessary safety distance is approached, are increasingly recognized by the eye as two separate light sources 7 and 10. The driver's attention is consequently directed briefly at this signal and thus at the fact that the necessary safety distance has been approached or undershot. The safety distance X is less than the safety distance Y.

According to one particular embodiment, the light sources 7 and 9, or 7 and 10, are controlled by a control unit in such a way that they are alternately switched on and off. In this configuration, therefore, given a sufficiently large distance from the light field, the two light sources 7 and 9, or 7 and 10, are perceived as a single light source. As a result of the alternate flashing of the light sources 7 and 9, or 7 and 10, this single light source thus appears from a distance to be luminous in a constant fashion, whereby the attention effect is additionally intensified in the case of the light field being approached and the resultant resolution of the two flashing separate light sources 7 and 9, or 7 and 10. As is readily apparent to the person skilled in the art, the distance starting from which the light sources 7 and 10 can be perceived as a single light source is greater than the distance for the light sources 7 and 9.

Figure 3:
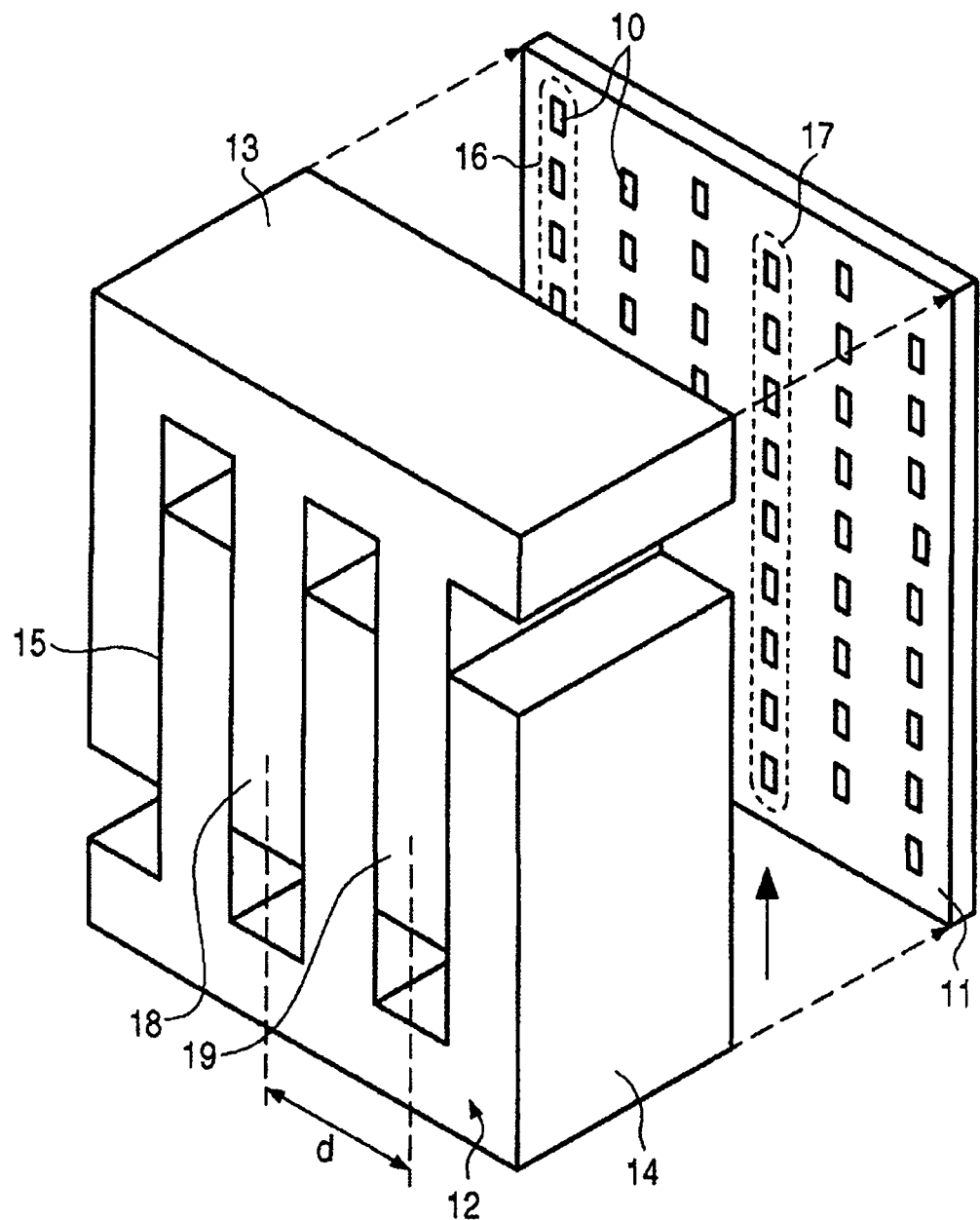
FIG. 3 shows a possible embodiment of the subject matter of the invention in a third schematic illustration

FIG. 3 shows a further possible embodiment of the substantive invention, wherein light emitting diodes (LEDs) 10 are provided as light sources of a light field 12 of a corresponding lighting device. It goes without saying that all other light sources known from the prior art can also be used.

In this case, according to one preferred embodiment, the light emitting diodes 10 are arranged in line and/or column form on a circuit board 11 and supplied by a corresponding power source (not illustrated).

The light field 12 is formed by an arrangement of two prisms 13, 14, which can be displaced into one another in a comb-like manner, there being formed between the prisms 13, 14 intermediate gaps 15 (for the sake of clarity, only a single intermediate gap is referenced), which is substantially opaque to light. Each prism 13, 14 is assigned a number of LEDs arranged behind the prisms 13, 14. Thus, by way of example, the first prism is assigned a first number 16 of LEDs (for the sake of clarity, only a single line of LEDs is correspondingly referenced in FIG. 3) and the second prism is assigned a second number 17 of LEDs (for the sake of clarity, only a single line of LEDs is correspondingly referenced in FIG. 3). The first and the second numbers 16, 17 of LEDs can be driven separately from one another by means of a suitable controller/control unit (not illustrated). Consequently, suitable flashing of the light field can be realized by the first and/or second number of LEDs 16, 17 being alternately switched off and on. In this case, the frequency of the activation and deactivation of the LEDs or of the corresponding parts of the light field 12 is tunable.

According to a further embodiment, it is possible to alter not only the frequency at which the LEDs are switched off and on, but also which LEDs are driven for generating the luminous configuration. By way of example, any desired groups of LEDs arranged on the circuit board 11 can be combined, wherein the groups of LEDs formed are at a distance from one another and are therefore perceived in the light field 12 by the observer at a suitable distance as separate light sources, a respective group of LEDs respectively forming a single light source for the observer. Although, by way of example, the webs 18, 19 of each prism in the light field 12 are in each case at an unalterable distance d from one another, what can be achieved by means of suitable grouping of the LEDs and corresponding separate control of these groups of LEDs is that, at relatively high speeds, for example, only every second web of each prism is switched on and off at the frequency provided.

Regions, in particular webs, of a first prism can equally be coupled to regions, in particular webs, of a second prism. As a result of all these measures, the resolution of the light field can be adapted toward smaller and larger distances.

Consequently, the signal effect of the rear light can be coordinated with a wide range of permissible safety distances.

In the case of the embodiment illustrated in FIG. 3, comb-like prism bodies are intermeshed in one another. The individual webs of the prism bodies have the necessary thicknesses to reach the desired safety distance of the following vehicle. The prism bodies are illuminated separately from one another by suitable luminous means (e.g. LED), and the illumination frequency set is intended to lead to the desired effect. The intermeshed prism bodies can also assume a different shape, e.g. a warning triangle or exclamation mark, as long as the embodiment is such that the flashing is no longer perceived starting from the desired distance. Luminous areas that are as far as possible identical in size, or uniform illumination should be taken into consideration in this case. The intermediate gap or separating gap 15 between the prism bodies 13 and 14 should be non-transparent in order to obtain a sharper separation of the light sources. Arranged behind the prism bodies is a carrier board, for example a circuit board 11 with LEDs fitted thereon. According to one exemplary embodiment of the invention, the arrangement of the LEDs and the configuration of the prisms can be chosen freely as long as the distance d corresponds to the distance between the LEDs on the circuit board. Finally, said separating gap 15 between the prisms can already be cast as a web on the carrier board or circuit board 11. The carrier board or circuit board 11 can additionally also include the control circuit for generating the alternate flashing and for processing the speed signal.

Figure 4:
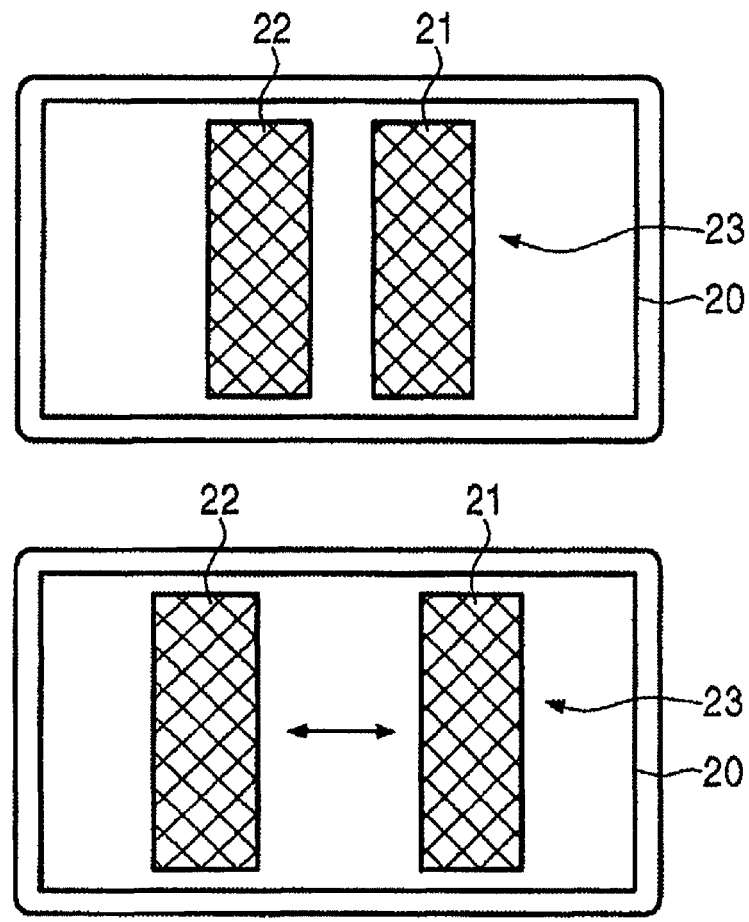
FIG. 4 shows a possible embodiment of the subject matter of the invention in a fourth schematic illustration

FIG. 4 presents a further embodiment of the present invention, according to which the distance between two light sources 21, 22 which are arranged in a rear light 20 and which jointly form a light field 23 can be suitably altered, that is to say decreased or increased, by means of a corresponding actuator (not illustrated), for example a mechanical actuating drive. As a result of such a measure, the resolution of the light field by the following driver and hence the light characteristic of the light field 23 can likewise be altered and, in particular, can be adapted to the speed of the vehicle in such a way that, as a result of the coordinated light field 23, it is only when the necessary safety distance is undershot that the driver of the following vehicle perceives two separate light sources 21, 22 in the light field 23, and a signal effect thus arises.

Figure 5:
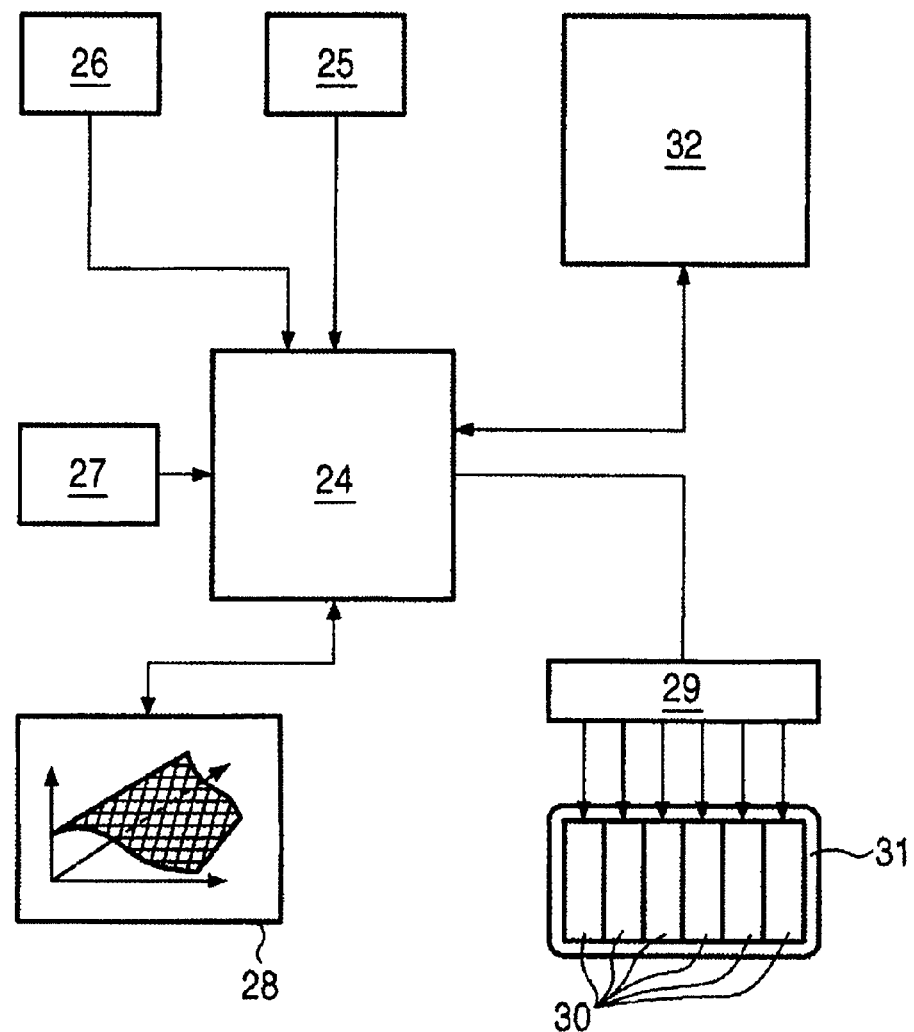
FIG. 5 shows a simplified block diagram of a possible embodiment of the subject matter of the invention

FIG. 5 illustrates a block diagram of one possible embodiment of the subject matter of the invention. In this case, a control unit 24 is provided, which is connected to a speed sensor 25, and also to a roadway sensor 26 for detecting the roadway constitution and a loading sensor 27 for detecting the loading state of the vehicle. On the basis of the data obtained by these sensors, a permissible safety distance is determined in the control unit 24. The determination of the safety distance is supported by a storage unit 28, in which are stored permissible safety distances with respect to the corresponding recorded or calculated parameters, for example by means of a multidimensional mapping. The desired safety distance is subsequently determined by means of interpolation or other analytical or numerical methods. A suitable energy supply unit 29 is driven on the basis of said safety distance, by means of which unit the light sources 30 of a rear light 31 can be driven, preferably separately from one another. According to a further preferred embodiment of the invention, the control unit 24 is connected to some other controller 32 of the vehicle or, if appropriate, is even integrated into the latter.

Figure 6:
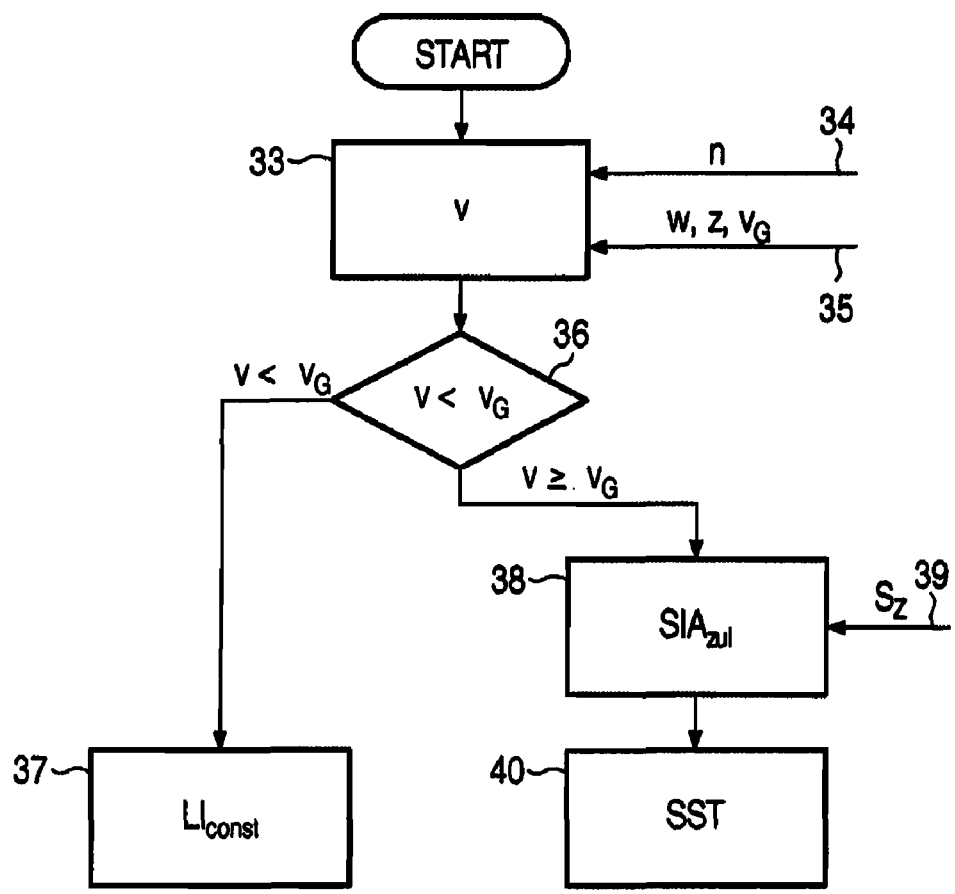
FIG. 6 shows a simplified illustration of a method flow diagram of a possible embodiment of the subject matter of the invention.

FIG. 6 illustrates a schematic sequential program of a method for controlling a lighting device according to the invention. In this case, in a first step 33, the vehicle speed v is determined by means of corresponding sensors. For this purpose, according to one preferred embodiment, the wheel rotational speed n of the vehicle is determined by means of a sensor 34 and the vehicle speed v is suitably calculated or estimated. Furthermore, according to a further embodiment, the loading state w of the vehicle and the roadway state z can be determined by means of suitable sensors 35. According to further possible embodiments, by way of example, an ambient brightness sensor and/or GPS sensor for position determination are provided as sensors. Afterward, in a further process step 36, a check is made to determine whether the vehicle speed v lies below a limit speed $v_G$. According to one possible embodiment, $v_G$ corresponds for example to the maximum speed permitted in a locality. If the vehicle speed lies below this limit speed, in a subsequent process step 37, a constant light intensity $LI_{const}$ is set at the rear light, for example. Consequently, for example in a locality or at low speeds, in particular at speeds at which the formation of lines of traffic is customary, it is possible to prevent the driver's attention from being distracted unnecessarily by activity of the rear light, for example flashing of the rear light. Such a changeover can be effected in a manner correspondingly damped by means of a corresponding damping circuit, such that the following driver is not distracted unnecessarily by the change in the light characteristic of the rear light. According to one particular embodiment, in this case a hysteresis loop is set up and used during the activation and deactivation of the constant light intensity $LI_{const}$. If the vehicle speed is greater than or equal to the limit speed, the permissible safety distance $SD_{perm}$ is determined in a further process step 38. This determination can be simplified for example by the provision of corresponding values $S_z$ stored in a storage unit 39. According to one embodiment, the safety distance is determined in a manner dependent on the speed of the vehicle, the loading state of the vehicle and also the roadway constitution. Other safety distances can then be interpolated or extrapolated on the basis of values defined in the storage unit 39. Finally, in a process step 40, a suitable control strategy CST for the control of the light configuration of the rear light is determined and employed.

According to further preferred embodiments, the following further configurations of the subject matter of the invention are possible:

By way of example, injection moldings having a plurality of chambers and two luminous means which are constructed in each case line by line with line-shaped diffusing screens in front of each chamber can be used for producing the lighting device. In this case, the diffusing screens have to be optically designed in such a way that the individual lines can in any event be perceived as such at the target distance.

According to another embodiment, use is made of mutually intermeshed prism bodies, in a manner similar to that illustrated in FIG. 3, which are optically separated from one another.

According to another embodiment, use is made of light emitting diodes, for example so-called organic light emitting diodes ("OLED") which are arranged in line form, the light emitting diodes either being soldered on a circuit board or, for technical design reasons, being fitted directly in a corresponding housing.

According to another embodiment, a display is used, in which case a display of correspondingly high luminous intensity could, if appropriate, likewise be driven in line-like fashion. On a display it is possible, in a technically simple manner, to represent other symbols (exclamation mark, warning triangle, chequerboard pattern, spiral etc.) which, in accordance with the present subject matter of the invention, on account of the resolution set, can only be perceived at the target distance. On account of the very high resolution, displays can also serve to realize different line thicknesses, which corresponds to different target distances. As a result, an adaptation to the travelling situations of countryside, expressway or reduced speed on the expressway, for example in roadworks, can be realized in a very simple manner.

The invention claimed is:

1. A distance lamp in passenger and/or goods traffic comprising a light field, which emits light in accordance with a luminous configuration, wherein the light field has a first and a second light source and provision is made of a control unit for controlling the luminous configuration of the light field, and the first and the second light sources are driven by the control unit and, by means of a control logic, the first and the second light sources are respectively assigned a temporally variable profile of light intensity thereof, wherein the light intensities of the first and of the second light sources are increased and decreased diametrically oppositely in each case at a predetermined time interval, and the luminous configuration of the light field is set with the aid of the control unit by control of the first and of the second light sources in a manner dependent on a first configuration parameter in such a way that the light field has an intensity which varies and has, for the eye of an average adult upon approaching the light field until reaching a predefined distance—dependent on the first configuration parameter—from the light field, a first luminous characteristic, which is characterized by a substantially constant light intensity, and, for the eye of an average adult, when the predefined distance from the light field is undershot, in accordance with a second luminous characteristic, the first light source is distinguished at least partly from the second light source and the alternately increasing and decreasing light intensity of the light sources of the light field is consciously perceptible, wherein the predefined distance is at least 0.5 meter from the light field.

2. The distance lamp as claimed in claim 1, wherein the control unit has a frequency unit, by means of which it is possible to change the light intensity of the first and of the second light sources with a frequency in a range of between 0.1 Hz and 75 Hz.

3. The distance lamp as claimed in claim 1, wherein the control unit has a frequency unit, by means of which it is possible to change the light intensity of the first and of the second light sources with a frequency in a range of between 0.1 Hz and 50 Hz.

4. The distance lamp as claimed in claim 1, wherein the control unit has a frequency unit, by means of which it is possible to change the light intensity of the first and of the second light sources with a frequency in a range of between 0.5 Hz and 10 Hz.

5. The distance lamp as claimed in claim 1, wherein the first and/or second light source of the light field are/is formed at least in part by a number of light emitting diodes or a display.

6. The distance lamp as claimed in claim 1, wherein the distance lamp is embodied as part of exterior lighting of a vehicle.

7. The distance lamp as claimed in claim 1, wherein speed of a vehicle is provided as first configuration parameter.

8. The distance lamp as claimed in claim 7, wherein a predetermined limit speed of the vehicle is provided as an activation threshold and the light field has a substantially constant light intensity below the limit speed.

9. The distance lamp as claimed in claim 8, wherein provision is made of an activation unit for activating and/or deactivating the constant light intensity of the light field, and the activation unit has a hysteresis loop.

10. The distance lamp as claimed in claim 1, wherein provision is made of a first sensor connected to the control unit and the light field and serving for determining the first configuration parameter.

11. The distance lamp as claimed in claim 10, wherein provision is made of a second sensor for determining a second configuration parameter, wherein a roadway constitution and/or a vehicle constitution and/or a time of day and/or a location determining signal and/or an ambient brightness is mapped by means of the second configuration parameter, and the sensor for determining the second configuration parameter is connected to the control unit in such a way that the luminous configuration of the light field is changed in a manner dependent on the second configuration parameter.

12. The distance lamp as claimed in claim 11, wherein the light field having the first and the second light sources and, if appropriate, additional light sources has a number of activatable light sources and, by means of the control logic by means of a selected activation of light sources from the number of activatable light sources or by means of a local adjustment of individual active light sources, the distance between the active light sources in the light field is set and/or altered in a manner dependent on the first configuration parameter.

13. A method for controlling a distance lamp in passenger and/or goods traffic comprising a light field, which emits light in accordance with a luminous configuration, wherein the light field has at least a first light source and a second light source and provision is made of a control unit having a control logic for controlling the luminous configuration of the light field, and the first and the second light sources are driven by the control unit and the first and the second light sources are respectively assigned a temporally variable profile of light intensity thereof, wherein the light intensities of the first and of the second light sources are increased and decreased diametrically oppositely in each case at a predetermined time interval, and the luminous configuration of the light field is set with the aid of the control unit by control of the first and of the second light sources in a manner dependent on a first configuration parameter in such a way that the light field has an intensity which varies and has, for the eye of an average adult upon approaching the light field until reaching a predefined distance—dependent on the first configuration parameter—from the light field, a first luminous characteristic, which is characterized by a substantially constant light intensity, and, for the eye of an average adult, when the predefined distance from the light field is undershot, in accordance with a second luminous characteristic, the first light source is distinguished at least partly from the second light source and the alternately increasing and decreasing light intensity of the light sources of the light field is consciously perceptible, wherein the predefined distance is at least 0.5 meter from the light field.

14. The method as claimed in claim 13, wherein the control unit has a frequency unit, which is used to change the light intensity of the first and of the second light sources with a frequency in a range of between 0.1 Hz and 75 Hz.

15. The method as claimed in claim 13, wherein the control unit has a frequency unit, which is used to change the light intensity of the first and of the second light sources with a frequency in a range of between 0.1 Hz and 50 Hz.

16. The method as claimed in claim 13, wherein the control unit has a frequency unit, which is used to change the light intensity of the first and of the second light sources with a frequency in a range of between 0.5 Hz and 10 Hz.

17. The method as claimed in claim 14, wherein the distance lamp is used as part of exterior lighting of a vehicle.

18. The method as claimed in claim 17, wherein the speed of the vehicle is recorded as first configuration parameter.

19. The method as claimed in claim 18, wherein the recorded speed of the vehicle is compared with a limit speed, and, in the case where a speed recorded by the sensor is below the limit speed, a substantially constant light intensity is allocated to the light field, if appropriate by means of the interposition of a hysteresis loop.

20. The method as claimed in claim 14, wherein provision is made of a first sensor connected to the control unit and the light field and serving for determining the first configuration parameter.

21. The method as claimed in claim 20, wherein provision is made of a second sensor for determining a further parameter, wherein the further parameter maps a roadway constitution and/or a vehicle constitution and/or a time of day and/or a location determining signal and/or an ambient brightness, and the control unit changes the luminous configuration of the light field in a manner dependent on the further parameter.

22. The method as claimed in claim 21, wherein the light field having the first and the second light sources and, if appropriate, additional light sources has a number of activatable light sources and, by means of the control logic by means of a selected activation of light sources from the number of activatable light sources or by means of a local adjustment of individual active light sources, the distance between the active light sources in the light field is altered in a manner dependent on the first configuration parameter.

* * * * *